July 15, 1958

J. T. FALLON 2,843,371

REGENERATIVE FURNACE

Filed March 30, 1955

J. T. FALLON
INVENTOR

July 15, 1958     J. T. FALLON     2,843,371
REGENERATIVE FURNACE

Filed March 30, 1955     2 Sheets-Sheet 2

J. T. FALLON
INVENTOR
BY Wilkinson & Mawhinney
ATTORNEY

United States Patent Office 2,843,371
Patented July 15, 1958

2,843,371

REGENERATIVE FURNACE

John Thomas Fallon, Olton, Birmingham, England

Application March 30, 1955, Serial No. 498,002

Claims priority, application Great Britain March 31, 1954

10 Claims. (Cl. 263—15)

This invention relates to regenerative furnaces for heating a charge with or without combustion thereof, in an oxidising, neutral or reducing atmosphere, and comprising a charge-receiving or working chamber, a pair of regenerators, an inlet for air or other gas with or without suitable pumping means, as required, an exhaust duct, a combustion chamber or chambers or other heating means and reversing valve means, all so interconnected that the air or gas can be caused to flow from the source successively through one regenerator, the heating means, the working chamber and the other regenerator to the exhaust duct, with reversal of flow at intervals.

The invention is applicable to regenerative furnaces empolying regenerators with matrices or chequer work of refractory material, such as firebrick, but is more especially applicable to furnaces, whose regenerators have metallic matrices, which, on account of their higher specific gravity, notwithstanding a lower specific heat, offer the advantage of considerably greater compactness for a given thermal capacity than refractory matrices, but are subject to temperature limitations.

The maximum safe working temperature of the elements of a metallic matrix is about 1100° C. and for the majority of the applications herein considered a preheat temperature of the air or gas supplied to the working chamber of 1000° C. at most is sufficient, so that metallic matrix regenerators will be satisfactory so long as the maximum temperature of the gases entering the heat-receiving regenerator does not exceed 1100° C. and is preferably rather less.

An object of this invention is an improved form of regenerative furnace of the kind first herein defined and characterised in that means are provided for bleeding a portion of the exhaust gases from the exhaust duct and recirculating them through the heat-receiving regenerator, in such a way as to dilute and thereby reduce the temperature of the gases leaving the working chamber before they reach the heat-receiving regenerator and to increase the total mass-flow of gases through the latter, the said means including a blower or pump for compensating the pressure drop across the heat-receiving regenerator.

In a regenerative furnace in which the heat-input is obtained by burning a suitable fuel in air preheated by the heat-rejecting regenerator, it may for some purposes, especially the re-heating of metals in the form of billets and the like without the formation of scale and other oxidation products, be necessary to maintain a reducing atmosphere in the working chamber. To accomplish this the fuel must be burnt with a defective air supply so that no free oxygen reaches the working chamber and the gases discharged from the working chamber will be rich in CO and $H_2$ and contain little or no $CO_2$ and $H_2O$, which at high temperatures tend to oxidise ferrous metals. Such partial combustion can produce the required high temperature in the working chamber if the preheat temperature of the combustion air is high enough, but the gases discharged from the working chamber have a residual calorific value owing to their content of CO and $H_2$.

In order to complete the combustion of these unburnt or incompletely burnt constituents of the gases discharged from the working chamber and the conservation in the system of their residual calorific value, the invention includes, as an optional feature, the provision of controllable means for introducing into the gases discharged from the working chamber a regulated supply of additional air, which may be derived either from the atmosphere, in which case the additional air may be introduced into the gases exhausted from the heat-receiving regenerator before reaching the means for bleeding-off a portion thereof for recirculation through such regenerator, or from the preheated air discharged from the heat-rejecting regenerator, in which case such portion of the preheated air is caused to by-pass the working chamber and to be mixed with the gases bled from the exhaust duct for recirculation through the heat-receiving regenerator, or the additional air may be derived from both these sources.

When preheated air is so by-passed into the discharge from the working chamber, the proportion of by-passed air to air supplied to the burners may be regulated by a valve in the by-pass duct in combination with a fixed restriction or adjustable damper in the duct supplying the burner.

Since the heating effect of this "after-burning" of incompletely burnt gases discharged from the working chamber will in any case tend to counteract the cooling effect of the recirculated exhaust gases, and the use for this purpose of preheated air will aggravate this heating effect, it will seldom be possible to use the preheated air as the sole source of the additional air for such after-burning, so that it will usually be necessary to supplement the preheated air (when used at all for this purpose) with cold atmospheric air.

When atmospheric air is introduced into the exhaust gas for the purpose above described it must (unless introduced under forced draught) be introduced at a point where the pressure of the exhaust gas is less than atmospheric (otherwise exhaust gas would escape rather than air enter) i. e. on the suction side of the exhaust blower or pump which compensates the pressure drop across the heat-receiving regenerator.

Except in the case in which preheated air is by-passed into the recirculated exhaust gases entering the heat-receiving regenerator, a reversing valve system is provided for directing the gases bled from the exhaust duct alternately to which ever regenerator is receiving heat, such reversing valve system preferably being coupled to the reversing valve means recited in the opening paragraph of this specification.

The reversing cycle may be controlled automatically by thermostatic devices responsive to the temperatures of the hot ends of the regenerators so as to cause reversal of flow when either of such temperatures exceeds an upper limit or falls below a lower limit.

When metallic-matrix regenerators are used the various valves and the reversing cycle should preferably be so adjusted and/or controlled that the temperature of the gases at the entry of the heat-receiving regenerator does not exceed 1000° C. and does not in any event exceed 1100° C.

The accompanying drawings illustrate by way of example only a specific constructional embodiment of the invention, including a modification of the control system thereof. The following description with reference to said drawings implies no limitation on the scope of the invention which is defined in the appended claims.

Figure 1:
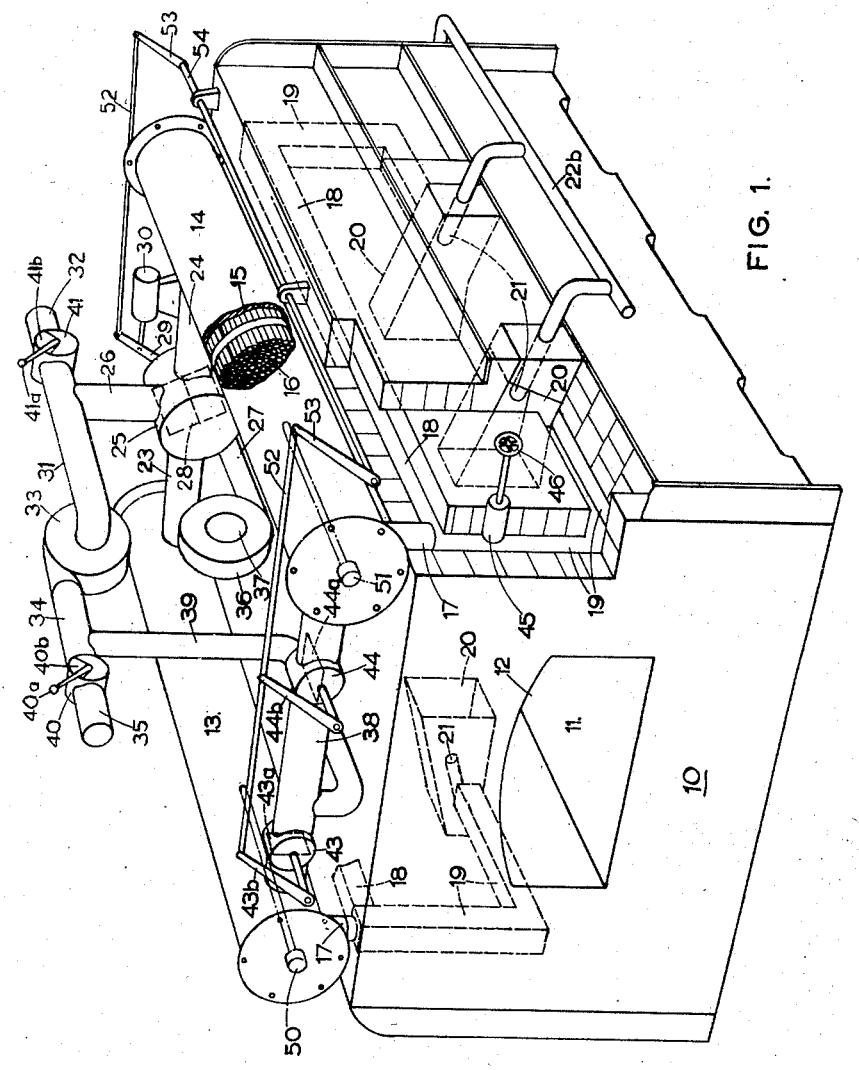
Figure 1 is a somewhat schematic, partly sectionalised perspective front view of a regenerative furnace.
Figure 2:
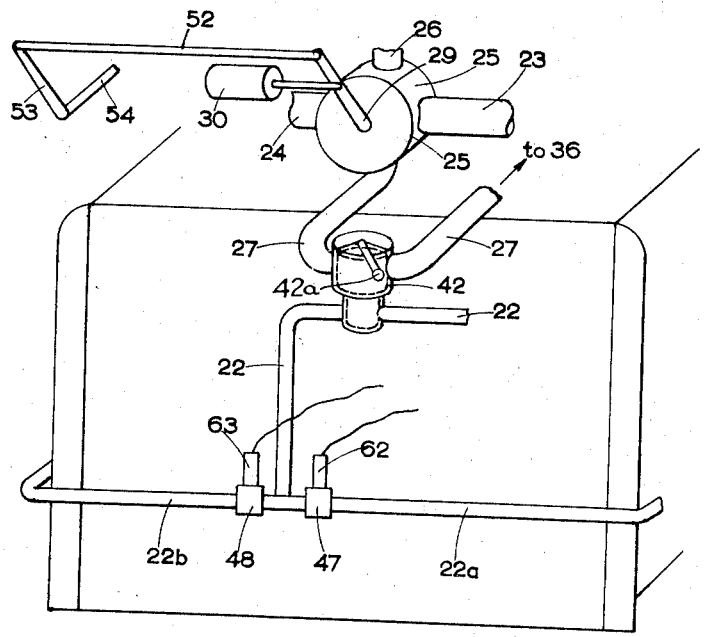
Figure 2 is a similar, fragmentary, rear view thereof.

Referring to Figures 1 and 2, the furnace proper is a rectangular structure 10 built of refractory bricks on a steel or other suitable metallic framework. This furnace has a working chamber 11 with shallowly arched roof extending from an opening 12 at the front to the back of the furnace, the opening 12 being closed when the furnace is operating by a door, not shown. On top of the furnace are two regenerators 13, 14 extending from front to back, one on each side. Each regenerator comprises a horizontal cylindrical metallic casing 15 covered with suitable lagging, although the lagging has been omitted from the drawing for the sake of clarity; and the interior of each casing 15 is packed with a metallic matrix composed of metal tubes, one of such matrices being shown at 16. The forward end of each regenerator communicates by means of a short vertical duct 17 with a horizontal duct 18 formed in the brickwork of the furnace. Duct 18 communicates by means of vertical and horizontal ducts 19 likewise formed in the brickwork of the furnace with transverse horizontal recesses 20 extending into the furnace wall from the working chamber. Recesses 20 constitute combustion chambers and contain burners 21 fed with oil or gas fuel from an external main 22 through branches 22a, 22b (see Figure 2) which respectively feed the burners on opposite sides of the furnace.

From the rear ends of the regenerators extend transverse horizontal pipes 23, 24 communicating with a common valve chamber 25 from the top of which extends a vertical pipe 26 and from the bottom of which extends a looped horizontal pipe 27. Chamber 25 also houses a reversing butterfly valve 28 rotatable through 90° in either sense by a lever 29 and a double acting, pneumatic jack 30. In the extreme position of valve 28 shown in the figure pipe 23 communicates with pipe 26 and pipe 24 with pipe 27. In the other extreme position of valve 28 pipe 23 communicates with pipe 27 and pipe 24 with pipe 26.

Pipe 26 communicates with a horizontal pipe 31 which extends from an atmospheric opening 32 to the inlet eye of a centrifugal exhaust blower 33, discharging into another horizontal pipe 34 terminating in an extension 35 for connection to an exhaust stack, not shown. Pipe 27 receives the discharge of a centrifugal inlet blower 36 whose inlet eye 37 is open to atmosphere.

The forward ends of the regenerators are further interconnected by a transverse horizontal pipe 38, which is connected to the horizontal limb of an L-shaped pipe 39, whose vertical limb is connected to the pipe 34.

Besides the reversing valve 28 and the fuel supply reversing valves hereinafter described the system includes other valves as follows: a proportioning valve 40 in the extension 35 of pipe 34; a regulating valve 41 in the atmospheric opening 32 of pipe 31; a combined air and fuel supply regulating valve 42; and valves 43, 44 in pipe 38 at or near its junctions with the regenerators 13, 14.

Valves 40 and 41 are of the butterfly type and are provided with means for adjusting them manually, herein indicated as levers 40a, 41a adjustable against fixed quadrants 40b, 41b.

Further, the vertical ducts 19 have dampers 45 manually adjustable from outside the furnace by means of screw-jacks and hand wheels 46.

The combined valve 42 (Figure 2) for regulating the primary air supply to the regenerators through pipe 27 and the fuel supply to the burners through main 22 is of the barrel type, the barrels (not shown) which respectively regulate the air and fuel supplies being coaxial and interconnected for operation by a single external lever 42a. Means (not shown) may be provided for adjusting the relative positions of the barrels, for varying the air/fuel ratio. The details of valve 42 are not illustrated since this is a conventional valve of known type. The valve 42 is an ordinary valve with two barrels for fuel and air respectively, manually adjustable to increase or decrease both fuel and air supply together by lever 42a, usually through a mechanical remote control linkage of rods and levers. The proportion of fuel to air cannot be adjusted when furnace is working, but only when shut down. To do this the valve must be dismantled and the fuel barrel can then be angularly adjusted relative to the air barrel and the valve reassembled.

The valves 43, 44 comprise butterflies 43a, 44a operated by levers 43b, 44b. Levers 43b, 44b and 29 are interconnected by a linkage comprising links 52, levers 53 and a rocking shaft 54, so that the levers 43b and 44b are thrown over through 90° concurrently with the throwing over of lever 29. The butterflies 28, 43a, 44a are so set with respect to their operating levers that when pipes 26 and 24 are in mutual communication, valve 44 is open and valve 43 is closed, and conversely. Alternating reversal of the fuel supply to the burners on opposite sides of the furnace, concurrently with alternation of the primary air supply to the regenerators, is effected by valves 47, 48 in the fuel main branches 22a, 22b (Figure 2) which are operated by electromagnets 62, 63. The reversing valve 28 is likewise operated, through the pneumatic relay constituted by jack 30, by an electromagnet 57 (see Figure 3) which actuates a pneumatic reversing valve 58 for selectively connecting a pneumatic supply line 59 to either end of the jack 30 through pneumatic connections 60, 61. The magnets 57, 62, 63 are controlled through an electromagnetic relay 56 by a time-base device 55 of known type, e. g. a clockwork device (details not illustrated), so as to reverse the flow through the regenerators and working chamber and feed the fuel alternately to the burners associated with the heat-rejecting regenerator, i. e. those on that side of the working chamber at which the preheated air is entering.

Figures 3, 4:
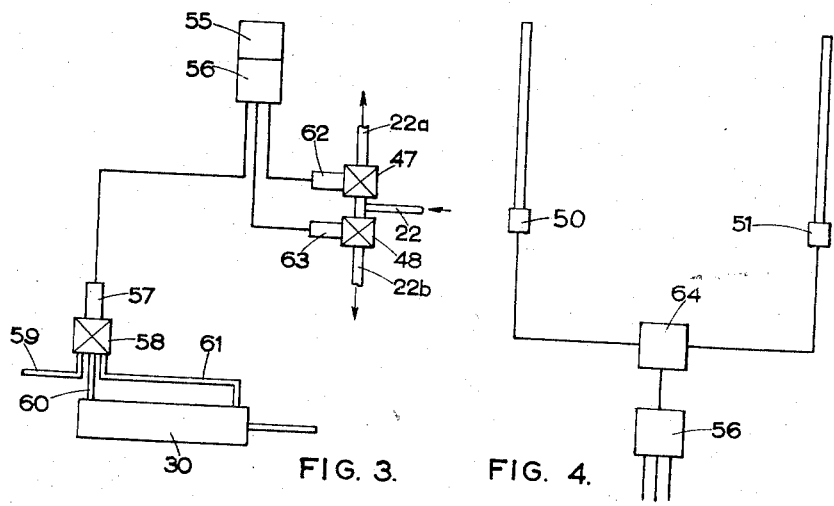
Figure 3 is a diagram illustrating the control system of the furnace of Figures 1 and 2.
Figure 4 is a diagram illustrating a modification of the control system of Figure 3.

The furnace as illustrated in Figures 1 to 3 operates as follows:

Primary air aspirated by blower 36 is fed through valve 42, pipe 27 and valve 28 to one of the regenerators, say 13, via pipe 23. Regenerator 13 thus rejects heat and preheats the primary air. At this time valve 43 is closed and the primary air therefore enters the combustion chambers 20 on the left hand side of the furnace (as seen in Figure 1) through ducts 17, 18, 19. In the combustion chambers it encounters fuel supplied to the burners 21 on that side of the furnace through branch fuel pipe 22a, valve 47 being then open and valve 48 closed. The hot combustion products enter the working chamber 11 and after traversing it are discharged through recesses 20 and ducts 19, 18 and 17 on the right of the furnace (as seen in Figure 1) into regenerator 14. The latter receives heat from these hot gases, which become cooled and are sucked out of the regenerator through pipes 24 and 26 by the exhaust blower 33, which will also suck in additional atmospheric air from opening 32 through valve 41 if the latter is not closed. Part of these gases pass to the stack outlet 35 through the proportioning valve 40, which, however, by throttling the outlet diverts a portion of the cool exhaust gases into pipe 39, whence it passes through pipe 38 and valve 44, which at that time is open, into the hot end of regenerator 14 where it becomes mixed with and dilutes the hot gases discharged from the working chamber, thus lowering their temperature, and is recirculated through regenerator 14. After a predetermined interval, the device 55 causes the valves 28, 43, 44, 47, 48 to be thrown over, so that the circulation through the working chamber, the ducts 17–19, the regenerators 13, 14 and pipes 23, 24 and 38 is reversed, the fuel supply being diverted from branch 22a to branch 22b. Combustion air now flows from valve 28 through pipe 24, the now heat-rejecting regenerator 14 and ducts 17, 18, 19 on the right hand side of the furnace into the furnace chamber 11, valve 44 being closed, and the gases leaving the furnace chamber at its left hand end through the left hand duct 17 pass through the now heat-receiving regenerator 13, pipe 23, valve 28, pipes 26 and 31, blower 33 and pipe 34 to the stack pipe 35 and to pipes 39, 38 as before, and since valve 43 is now open, the exhaust gas diverted to pipes 39, 38 by valve 40 enters the hot end of regenerator 13 together with the gas leaving the furnace chamber by the left hand duct 17.

Valves 28, 43 and 44 are each two-position valves and are mechanically interconnected. In one position valve 28 directs combustion air supplied by blower 36 from pipe 27 to regenerator 14 via pipe 24 and gas exhausted from regenerator 13 via pipe 23 to pipes 26 and 31. When valve 28 is in this position valve 43 is open and valve 44 closed. In the other position, valve 28 directs combustion air from pipe 27 to pipe 23 and regenerator 13 and exhaust from regenerator 14 and pipe 24 to pipes 26 and 31. In both positions, the exhaust gas is sucked from pipes 26, 31 by blower 33 and delivered to pipe 34, part going to stack pipe 35 and part to pipe 38 via pipe 39, the proportions of these two parts being regulated by the valve 40. The exhaust gas fed to pipe 38 is directed by valves 43, 44 to the inlet end of whichever regenerator is for the time being receiving gas from the furnace and exhausting it to pipes 26, 31, blower 33 and pipes 34, 35, 39, 38. After an equal interval a further reversal takes place and so on. The quantity of exhaust gas recirculating, which determines the temperature drop between the working chamber and the hot end of the heat-receiving regenerator, is regulated by adjusting the proportioning valve 40, and this adjustment, once correctly made, need not be altered so long as the heat input and load on the furnace, i. e. the heat capacity of the charge, remain substantially constant. The character of the atmosphere in the working chamber (reducing or oxidising) is determined by the relative adjustment of the barrels of the combined air and fuel valve 42, and the setting of valve 41 is determined primarily by the consideration that enough extra air is to be admitted into the exhaust system to ensure complete combustion of the combustible constituents of the gases discharged from the working chamber. Excess air may be admitted through valve 41, if difficulty is encountered in keeping the temperatures of the hot ends of the regenerators within the prescribed upper limit. Once appropriately adjusted for the operating conditions, re-adjustment of valve 41 will not normally be required so long as these conditions remain substantially unaltered. Dampers 45 serve primarily for balancing the air supplies to the burners so as to obtain even heating of the working chamber.

The interval between successive reversals of flow is determined by the setting of the time-base device 55. This interval is so selected that the fluctuations of temperature of the hot ends of the regenerators is kept within prescribed upper and lower limits. The mean value of the temperature of these hot ends depends, for a given set of operating conditions, primarily on the setting of the proportioning valve 40, and secondarily on the setting of the additional air valve 41, while the amplitude through which this temperature fluctuates depends on the time interval between reversals of flow.

If it is desired to use preheated air for the after-burning of combustible residues in the gases discharged from the working chamber, the linkage 52—54 must be disconnected and the valves 43, 44 set by hand, in conjunction with hand setting of the dampers 45, so that a required proportion of preheated air from the heat-rejecting regenerator enters the pipe 38 and is there mixed with the exhaust gases discharged from pipe 39.

Figure 4 illustrates an alternative automatic control system for the furnace. In this arrangement the reversing valves 28, 43, 44, 47 and 48 are thermostatically controlled. In the "hot" end of each regenerator is a thermocouple 50 or 51 (also shown in Figure 1 in chain-dotted lines) the output of each of which is fed to a thermostatic control device 64, which controls the excitation of the electromagnets 57, 62, 63 through relay 56, to which the device 64 is directly connected, the time-base device 55 being omitted. The thermostatic controller 64 is a conventional article of commerce. It operates thus: if the hot junction of a thermocouple (e. g. 50) gets too hot, the E. M. F. generated (suitably amplified by known means) operates a relay to close a switch in the controller 64 which, acting if necessary through a further relay, excites (or isolates as the case may be) magnets 57, 62, 63 to reset valves 47, 48, 58 to reverse the flow through the regenerators.

This arrangement operates as follows:

When the temperature of the hot end of either regenerator (when receiving heat) exceeds a predetermined upper limit, say 1000° C., or when the temperature of the hot end of either regenerator (when rejecting heat) falls below a predetermined lower limit, the signal received from the associated thermocouple 50 or 51 by the thermostatic device 64 causes the latter, acting through the relay 56, either to excite or isolate, as the case may be, the electromagnets 57, 62, 63, so that the pneumatic reversing valve 58 and fuel supply reversing valves 47, 48 are thrown over to reverse the flow of air and gases through the system and switch the fuel supply from the burners on one side of the furnace to those on the opposite side, so that fuel is supplied only to those burners that are being supplied with preheated air. The outputs of the two thermocouples operate in opposite senses on the thermostatic device 64, so that if for instance the signal received from thermocouple 50 when its temperature falls below the lower limit causes the device 64, acting through the relay 56, to excite the magnets 57, 62, 63, a corresponding signal received from thermocouple 51 will bring about the isolation of these three magnets.

The thermostatic control illustrated in Figure 4 may, however, be installed, in addition to the time-base control device 55, as an overriding control to ensure that reversal of flow takes place before any overheating can occur in the event of a breakdown or defect of the time-base control device.

The constructional embodiment of the invention herein illustrated and particularly described is intended for the "static" treatment of single charges, which are introduced into the working chamber through the furnace door and removed, after treatment, in the same way. The invention is also applicable to continuous furnaces in which the charge, or a succession of charges, is/are moved continuously during the heat-treatment from one end of the furnace to the other, both ends of which have openings, one for receiving the charges, and the other for discharging them after treatment, such openings being continuously open or opened intermittently and conventional devices of known type being provided as may be required for minimising heat losses and contamination of the furnace atmosphere through the open ends.

I claim:

1. A regenerative furnace comprising a refractory structure provided with a working chamber having at least one recess on each side thereof, each such recess constituting a combustion chamber, two similar regenerators having heat-receiving and -rejecting matrices of metallic elements mounted on said structure, ducts within said structure connecting one end (hereinafter referred to as the "hot" end) of one regenerator with the recess on one side of said working chamber and similar ducts connecting the recess on the opposite side of said working chamber with the corresponding (hot) end of the other regenerator, a pipe extending from the opposite end (hereinafter referred to as the "cold" end) of each regenerator, an atmospheric air-aspirating blower, an air delivery pipe extending therefrom, an exhaust blower, an exhaust duct connected to the suction side of said exhaust blower, an exhaust duct extension connected to the delivery side of said exhaust blower and exhausting to atmosphere, a reversing valve having connections to said air delivery pipe, said exhaust duct and both said pipes extending from the cold ends of the regenerators for selectively connecting the cold end of one regenerator to the air delivery pipe and that of the other regenerator to the exhaust duct and conversely, a pipe interconnecting the hot ends of said regenerators, a pipe (hereinafter referred to as a "recirculating" pipe) connecting said regenerator-interconnecting pipe with said exhaust duct extension, an adjustable proportioning valve in said exhaust duct extension for regulating the proportions in which the delivery of said exhaust blower is divided between atmosphere and the recirculating pipe, two valves in said interconnecting pipe one on each side of its junction with said recirculating pipe, a mechanical linkage so interconnecting said last named valves with said reversing valve as to establish communication between the recirculating pipe and that regenerator for the time being in communication through the reversing valve with the exhaust duct and to interrupt communication between the recirculating pipe and the other regenerator, a main supplying fluid fuel, an adjustable, combined air- and fuel-regulating valve including an air regulating part and a fuel regulating part, the air regulating part being disposed in the air delivery pipe and the fuel regulating part in the fuel main, a fuel burner in each of said recesses, a branch pipe from said fuel main feeding the burner on one side of the furnace and a similar branch pipe feeding the burner on the opposite side thereof, a valve in each such branch pipe, an electromagnet operatively connected to each branch pipe valve and adapted to open and close each such valve, a pneumatic relay operatively connected to said reversing valve for actuating it, an electromagnet operatively connected to said pneumatic relay for actuating it, an electromagnetic relay operatively connected to all three of said electromagnets for controlling them so that the valve in the branch pipe supplying the burner in the recess connected to that regenerator, which is for the time being in communication through the reversing valve with the air delivery pipe, is open and the valve in the other such branch pipe is closed, and means operatively connected to said electromagnetic relay for effecting alternating reversal of the action of said electromagnetic relay.

2. A regenerative furnace as defined in claim 1, in which the exhaust duct has an opening to atmosphere and which further includes an adjustable valve for regulating the admission of air through said opening into said exhaust duct.

3. A regenerative furnace as defined in claim 1, in which the means for effecting alternating reversal of the action of the electromagnetic relay comprise a time-responsive device adapted to bring about such reversal at regular time intervals.

4. A regenerative furnace as defined in claim 1, in which the means for effecting alternating reversal of the action of the electromagnetic relay comprise a temperature responsive device in the hot end of each regenerator adapted to transmit a "reversing" signal to the electromagnetic relay when its temperature reaches a critical upper limit.

5. A regenerative furnace as defined in claim 1, in which the means for effecting alternating reversal of the action of the electromagnetic relay comprise a temperature responsive device in the hot end of each regenerator adapted to transmit a "reversing" signal to the electromagnetic relay when its temperature reaches a critical lower limit.

6. A regenerative furnace comprising a working chamber, an exhaust gas duct therefor, a pair of regenerators, an inlet for gaseous fluid, means, e. g. combustion chambers, for supplying heat to such gaseous fluid, reversing valved means for causing the gaseous fluid to flow from the inlet successively through one regenerator, the heating means, the working chamber and the other regenerator to the exhaust duct, with reversal of flow at intervals, said furnace further comprising means operatively connected to said exhaust duct for bleeding a portion of the exhaust gases from the exhaust duct and recirculating such portion through the last mentioned regenerator so that the gases leaving the working chamber are diluted with and somewhat cooled by said bled gases before entering the last mentioned regenerator, said means including a pumping device for compensating the pressure drop across the last mentioned regenerator, the heat supplying means adapted to burn a fuel in the air preheated by the regenerator which for the time being is connected to the gaseous fluid inlet, controllable means for introducing a regulated quantity of atmospheric air into the gases being exhausted from the regenerator which for the time being is connected to the exhaust duct before such gases reach the means by which a portion thereof is bled-off for recirculation through said regenerator, so as to promote or complete the combustion of any unburnt or incompletely burnt fuel remaining in the gases discharged from the working chamber and the conservation of the residual calorific value of the last mentioned gases.

7. A regenerative furnace comprising a working chamber, an exhaust gas duct therefor, a pair of regenerators, an inlet for gaseous fluid, means, e. g. combustion chambers, for supplying heat to such gaseous fluid, reversing valved means for causing the gaseous fluid to flow from the inlet successively through one regenerator, the heating means, the working chamber and the other regenerator to the exhaust duct, with reversal of flow at intervals, said furnace further comprising means operatively connected to said exhaust duct for bleeding a portion of the exhaust gases from the exhaust duct and recirculating such portion through the last mentioned regenerator so that the gases leaving the working chamber are diluted with and somewhat cooled by said bled gases before entering the last mentioned regenerator, said means including a pumping device for compensating the pressure drop across the last mentioned regenerator, the heat supplying means adapted to burn a fuel in the air preheated by the regenerator which for the time being is connected to the gaseous fluid inlet, controllable means for bleeding a regulated portion of such preheated air from the discharge of the last mentioned regenerator causing such portion to by-pass the working chamber and mixing it with gases bled from the exhaust duct for recirculation through the regenerator which for the time being is connected to the exhaust duct, so as to promote or complete the combustion of any unburnt or incompletely burnt fuel remaining in the gases discharged from the working chamber and the conservation of the residual calorific value of the last mentioned gases.

8. A regenerative furnace comprising a working chamber, an exhaust gas duct therefor, a pair of regenerators, an inlet for gaseous fluid, means, e. g. combustion chambers, for supplying heat to such gaseous fluid, reversing valved means for causing the gaseous fluid to flow from the inlet successively through one regenerator, the heating means, the working chamber and the other regenerator to the exhaust duct, with reversal of flow at intervals, said furnace further comprising means operatively connected to said exhaust duct for bleeding a portion of the exhaust gases from the exhaust duct and recirculating such portion through the last mentioned regenerator so that the gases leaving the working chamber are diluted with and somewhat cooled by said bled gases before entering the last mentioned regenerator, said means including a pumping device for compensating the pressure drop across the last mentioned regenerator, at least one burner associated with each regenerator and supplied with preheated air by its regenerator and reversing fuel valve means coupled to the reversing valved means so as to supply fuel alternately to that burner which is receiving a supply of preheated air.

9. A regenerative furnace comprising a working chamber, an exhaust gas duct therefor, a pair of regenerators, an inlet for gaseous fluid, means, e. g. combustion chambers, for supplying heat to such gaseous fluid, reversing valved means for causing the gaseous fluid to flow from the inlet successively through one regenerator, the heating means, the working chamber and the other regenerator to the exhaust duct, with reversal of flow at intervals, said furnace further comprising means operatively connected to said exhaust duct for bleeding a portion of the exhaust gases from the exhaust duct and recirculating such portion through the last mentioned regenerator so that the gases leaving the working chamber are diluted with and somewhat cooled by said bled gases before entering the last mentioned regenerator, said means including a pumping device for compensating the pressure drop across the last mentioned regenerator, and thermostatically controlled means responsive to the temperatures of the "hot" ends of the regenerators for effecting reversal of gas flow through the regenerators and working chamber when the temperature of the hot end of either regenerator reaches a predetermined limit.

10. A regenerative furnace as defined in claim 9, including at least one combustion chamber associated with each regenerator, a common fuel main, said thermostatically controlled means comprising a reversible valve means for directing a supply of fuel from said common main alternately to each of such combustion chambers, said reversbile valve means being so controlled by the thermostat that the fuel is supplied to the combustion chamber associated with and supplied with preheated air by the regenerator which for the time being is connected to the inlet.

References Cited in the file of this patent

UNITED STATES PATENTS

| | | |
|---|---|---|
| 1,054,643 | Gray et al. | Feb. 25, 1913 |
| 1,129,083 | Frink | Feb. 23, 1915 |
| 1,166,069 | Macmillan | Dec. 28, 1915 |
| 1,921,507 | Culbertson | Aug. 8, 1933 |
| 2,137,856 | Rice | Nov. 22, 1938 |